(12) United States Patent
Chou

(10) Patent No.: US 8,964,948 B2
(45) Date of Patent: Feb. 24, 2015

(54) METHOD FOR SETTING VOICE TAG

(75) Inventor: Fu-Chiang Chou, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 167 days.

(21) Appl. No.: 13/483,014

(22) Filed: May 29, 2012

(65) Prior Publication Data

US 2012/0237007 A1 Sep. 20, 2012

Related U.S. Application Data

(62) Division of application No. 12/203,125, filed on Sep. 2, 2008, now Pat. No. 8,229,507.

(30) Foreign Application Priority Data

Feb. 5, 2008 (TW) .............................. 97104613 A

(51) Int. Cl.
*H04M 1/64* (2006.01)
*H04M 1/27* (2006.01)

(52) U.S. Cl.
CPC .......... *H04M 1/271* (2013.01); *H04M 2250/74* (2013.01)
USPC .... 379/88.03; 345/173; 358/1.15; 379/88.01; 379/88.04; 455/403; 455/563; 455/564; 455/569.1; 455/575.1; 704/201; 704/244; 704/251; 704/256.2; 704/275

(58) Field of Classification Search
CPC ... H04M 1/271; H04M 1/57; H04M 1/72519; H04M 2201/40
USPC ............ 345/173; 358/1.15; 379/88.01, 88.03, 379/89, 88.04; 455/403, 563, 575.1, 564, 455/569.1; 704/201, 244, 270, 240, 247, 704/251, 256.2, 275
See application file for complete search history.

(56) References Cited

U.S. PATENT DOCUMENTS

| | | | | |
|---|---|---|---|---|
| 5,369,685 | A * | 11/1994 | Kero | 379/88.04 |
| 5,452,340 | A * | 9/1995 | Engelbeck et al. | 379/88.03 |
| 5,802,149 | A * | 9/1998 | Hanson | 379/88.03 |
| 6,134,527 | A * | 10/2000 | Meunier et al. | 704/247 |
| 6,226,612 | B1 * | 5/2001 | Srenger et al. | 704/256.2 |
| 6,263,216 | B1 * | 7/2001 | Seydoux et al. | 455/564 |
| 6,393,304 | B1 * | 5/2002 | Meche | 455/563 |
| 6,690,772 | B1 * | 2/2004 | Naik et al. | 379/88.03 |
| 6,970,817 | B2 * | 11/2005 | Ross et al. | 704/201 |
| 7,010,484 | B2 * | 3/2006 | Lin | 704/240 |
| 7,050,550 | B2 * | 5/2006 | Steinbiss et al. | 379/88.01 |
| 7,050,976 | B1 * | 5/2006 | Packingham | 704/270 |
| 7,158,249 | B2 * | 1/2007 | Watanabe | 358/1.15 |
| 7,412,036 | B1 * | 8/2008 | Charpentier et al. | 379/88.03 |
| 7,450,111 | B2 * | 11/2008 | Hietala et al. | 345/173 |
| 7,471,775 | B2 * | 12/2008 | Cheng | 379/88.01 |

(Continued)

*Primary Examiner* — Gerald Gauthier
(74) *Attorney, Agent, or Firm* — Jianq Chyun IP Office

(57) ABSTRACT

A method for setting a voice tag is provided, which comprises the following steps. First, counting a number of phone calls performed between a user and a contact person. If the number of phone calls exceeds a predetermined times or a voice dialing performed by the user is failed before calling to the contact person within a predetermined duration, the user is inquired whether or not to set a voice tag corresponding to the contact person after the phone call is complete. If the user decides to set the voice tag, a voice training procedure is executed for setting the voice tag corresponding to the contact person.

10 Claims, 3 Drawing Sheets

(56) References Cited

U.S. PATENT DOCUMENTS

| | | |
|---|---|---|
| 7,483,520 B2 * | 1/2009 | Han et al. .................... 379/88.03 |
| 7,660,715 B1 * | 2/2010 | Thambiratnam ............. 704/244 |
| 8,229,507 B2 * | 7/2012 | Chou ........................... 455/563 |
| 2004/0204168 A1 * | 10/2004 | Laurila ....................... 455/569.1 |
| 2005/0114131 A1 * | 5/2005 | Stoimenov et al. ........... 704/251 |
| 2005/0154587 A1 * | 7/2005 | Funari et al. .................. 704/247 |
| 2006/0183513 A1 * | 8/2006 | Slamka et al. ............. 455/575.1 |
| 2006/0215821 A1 * | 9/2006 | Rokusek et al. ........... 379/88.01 |
| 2006/0287867 A1 * | 12/2006 | Cheng et al. ................. 704/275 |
| 2007/0135087 A1 * | 6/2007 | Villevieille et al. ........... 455/403 |
| 2007/0142024 A1 * | 6/2007 | Clayton et al. ................ 455/403 |
| 2009/0196404 A1 * | 8/2009 | Chou ........................ 379/88.03 |
| 2012/0237007 A1 * | 9/2012 | Chou ........................ 379/88.03 |

* cited by examiner

METHOD FOR SETTING VOICE TAG

CROSS-REFERENCE TO RELATED APPLICATION

This application is a divisional application of U.S. application Ser. No. 12/203,125 filed on Sep. 2, 2008, now pending, which claims the priority benefit of Taiwan application serial no. 97104613, filed on Feb. 5, 2008. The entirety of each of the above-mentioned patent applications is hereby incorporated by reference herein and made a part of specification.

BACKGROUND OF THE INVENTION

1. Field of the Invention

The subject application relates to a method for setting a voice tag. More particularly, the subject application relates to a method for automatically reminding a user to set a voice tag.

2. Description of Related Art

With a great development of electronic techniques, consumer electronic products become an essential part for people's daily life. Meanwhile, handheld electronic products with various functions are developed accordingly, in which mobile phones have become indispensable communication tools for people's daily life. A present mobile phone not only has features of lightness, slimness, shortness and smallness, but also is functional and easy for utilization. Consequently, a voice dialing function has become an indispensable function for the mobile phone.

The voice dialing mainly relates to a speaker dependent voice recognition technique and a speaker independent voice recognition technique. A user using the speaker dependent voice recognition technique needs to perform a voice training in allusion to a contact person for setting a corresponding voice tag, so as to perform the voice recognition. However, due to different interfaces of the mobile phones, the user usually do not know how to perform the training or feels the training procedure is too complicated, which may leads to a low utilization of the voice dialing. The user using the speaker independent voice recognition technique generally has a low recognition rate due to different accents of the user. Therefore, will of using the voice dialing function by the user is decreased.

SUMMARY OF THE INVENTION

The subject application is directed to a method for setting a voice tag, by which a user may be automatically reminded to set a voice tag according to a phone call record and a utilization habit of the user, so as to improve a utilization convenience of a voice dialing.

Accordingly, the subject application provides a method for setting a voice tag, which is suitable for a contact person without a voice tag being established. The method comprises the following steps. First, a number of phone calls performed between a user and the contact person is counted. Next, when the number of the phone calls exceeds a predetermined times, the user is inquired whether or not to set the voice tag corresponding to the contact person. Finally, if the user decides to set the voice tag, a voice training procedure is performed for setting the voice tag corresponding to the contact person.

In an embodiment of the subject application, the step of inquiring the user whether or not to set the voice tag corresponding to the contact person when the number of the phone calls exceeds the predetermined times further includes a following step. If the number of the phone calls performed between the user and the contact person does not exceed the predetermined times and a voice dialing performed by the user is failed before calling to the contact person within a predetermined duration, the user is also inquired whether or not to set the voice tag corresponding to the contact person.

In an embodiment of the subject application, the method for setting the voice tag further includes recording a voice dialing speech of the user when the user performs the voice dialing.

In an embodiment of the subject application, in the step of performing the voice training procedure for setting the voice tag, if the voice dialing performed by the user is failed before calling to the contact person within the predetermined duration, the voice tag then may be directly set according to the voice dialing speech of the user, which is recorded within the predetermined duration.

In an embodiment of the subject application, the voice dialing speech of the user may also be re-recorded for setting the voice tag corresponding to the contact person.

In an embodiment of the subject application, in the step of counting the number of the phone calls performed between the user and the contact person, the contact person is further identified according to a phone number of the contact person.

In an embodiment of the subject application, in the step of performing the voice training procedure for setting the voice tag, the contact person is further added to a contact list.

In an embodiment of the subject application, before the step of counting the number of the phone calls performed between the user and the contact person, completion of the phone call between the user and the contact person is waited.

In an embodiment of the subject application, the step of inquiring the user whether or not to set the voice tag corresponding to the contact person further includes performing an inquiring action such as a voice or a picture notification after the phone call performed between the user and the contact person is completed.

The subject application provides another method for setting a voice tag, which is suitable for a contact person without a voice tag being established. The method includes the following steps. First, if a voice dialing performed by the user is failed before calling the contact person within a predetermined duration, the user is inquired whether or not to set a voice tag corresponding to the contact person. Next, if the user decides to set the voice tag, a voice training procedure is performed for setting the voice tag corresponding to the contact person.

In an embodiment of the subject application, the method for setting the voice tag further includes recording a voice dialing speech of the user when the user performs the voice dialing.

According to another aspect, the subject application provides a method for setting a voice tag. The method includes the following steps. First, a voice dialing speech of a user is recorded when the user performs a voice dialing. Next, a number of phone calls performed between the user and a contact person is counted if the contact person still does not have a corresponding voice tag. Next, if the number of the phone calls performed between the user and the contact person exceeds a predetermined times or the voice dialing performed by the user is failed before calling the contact person within a predetermined duration, the user would be inquired whether or not to set a voice tag corresponding to the contact person after the phone call is completed. Finally, if the user decides to set the voice tag, the voice dialing speech of the user is re-recorded for setting the voice tag, or the voice tag is set according to the voice dialing speech of the user recorded within the predetermined duration.

According to the subject application, after the phone call performed between the user and the contact person is completed, if the contact person does not have a corresponding voice tag and the voice dialing cannot be performed during a next phone call, the user may be automatically reminded to set the voice tag of the contact person. By such means, will of using the voice dialing by the user may be improved, and complexities of using the voice training procedure and setting the voice tag are simplified, and meanwhile will and convenience of using the voice dialing by the user are improved.

In order to make the aforementioned and other objects, features and advantages of the present invention comprehensible, a preferred embodiment accompanied with figures is described in detail below.

DESCRIPTION OF EMBODIMENTS

First Embodiment

Figure 1:
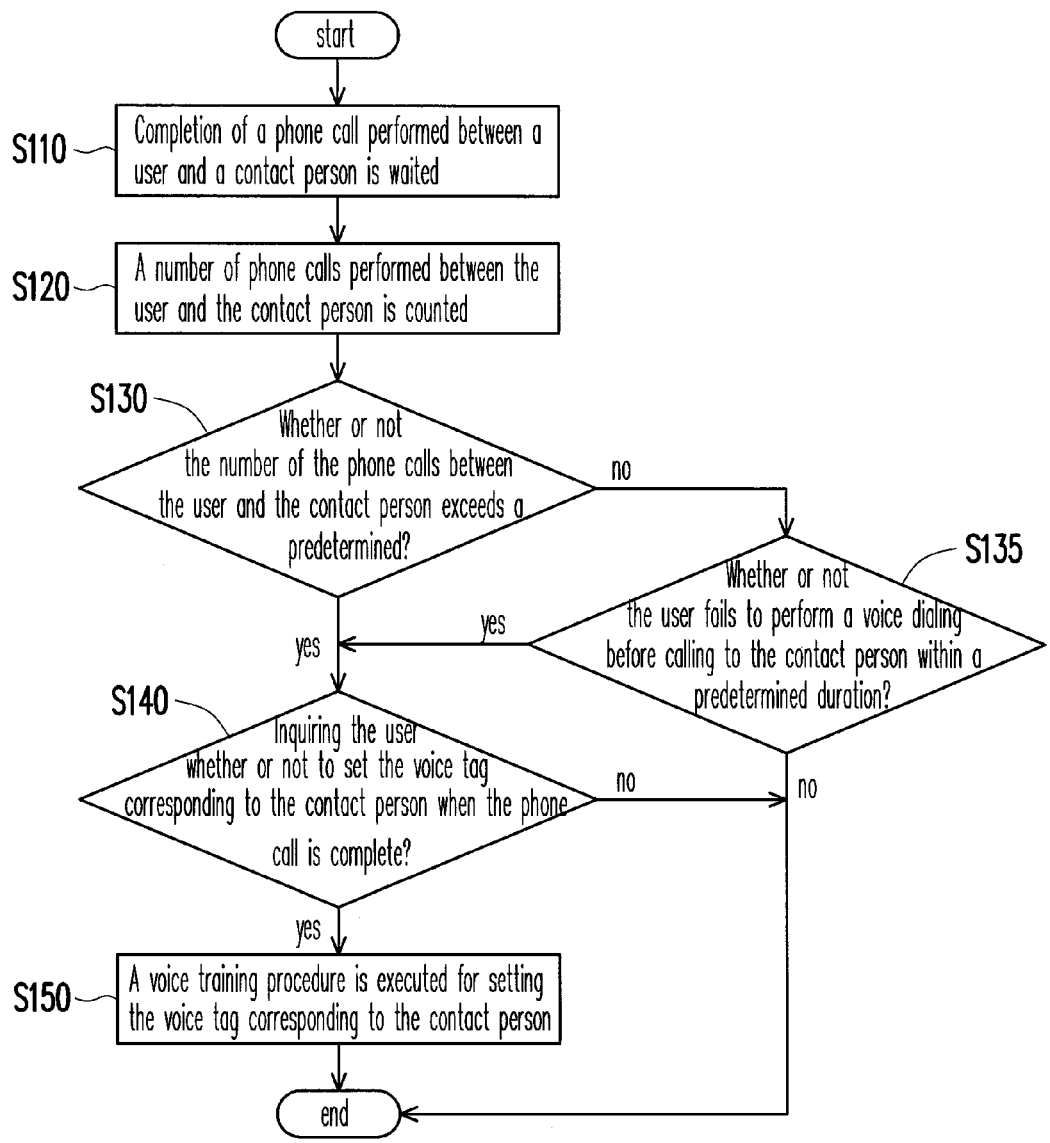
FIG. 1 is a flowchart illustrating a method for setting a voice tag according to a first embodiment of the present invention.

Referring to FIG. 1, FIG. 1 is a flowchart illustrating a method for setting a voice tag according to a first embodiment of the present invention. The method is suitable for a contact person without a corresponding voice tag being established. First, in step S110, waiting for a phone call performed between a user and the contact person is completed. The contact person may be included within a contact list, or may be a contact person that is not included within the list. The step S110 is not necessarily to be the first step, and is only an example for one of the embodiments. Next, counts a number of phone calls performed between the user and the contact person (step S120), namely, the number of times for the user dialing to the contact person is counted. Such step may be performed while the user makes a phone call to the contact person, which is not limited to be performed after the step S110. The step S110 may also be performed after a step S130 and a step S135 (i.e. after the "yes" flow directions of two diamond judgement blocks), though it is not illustrated.

Next, concerning whether or not the number of the phone calls performed between the user and the contact person exceeds a predetermined times (the step S130). If the number exceeds the predetermined times, get in step S140, the user is inquired whether or not to set a voice tag corresponding to the contact person after the phone call is complete; if not, get in step S135, concerning whether or not a voice dialing performed by the user is failed before calling the contact person within a predetermined duration, and if the voice dialing is failed, then get in step S140. In other words, as long as the number of the phone calls performed between the user and the contact person exceeds the predetermined times, or the voice dialing_performed by the user is failed before calling to the contact person within the predetermined duration, the user would be inquired whether or not to set a voice tag corresponding to the contact person after the phone call is completed, so as to facilitate a next time dialing. In which, the so called "before calling the contact person" means the time before a moment that the phone call is performed, and the so called "predetermined duration" is included within the foregoing defined time range.

Next, if the user decides to set the voice tag, get in step S150, in which a voice training procedure is performed for setting the voice tag corresponding to the contact person. The voice training procedure may be a general procedure for setting the voice tag, by which a voice dialing speech of the user may be re-recorded for setting the voice tag; alternatively, the former failed voice dialing speech could be stored directly and used for setting the voice tag. The user can make a decision from the above two methods. It should be noted that in the present embodiment, when the user performs the voice dialing, the corresponding voice dialing speech is stored for setting a new voice tag.

In addition, the above predetermined times and the predetermined duration may all be decided by the user personally, or the predetermined times and the predetermined duration may be reset according to a parameter setting process of a general mobile phone, which will not be repeated herein. Moreover, it should be noted that if the contact person is still not added within the contact list, the contact person is then directly added to the contact list for later utilization, when the user decides to set the voice tag. Method of inquiring the user whether or not to set the voice tag includes character, picture reminder or voice notification, or voice and picture/character collaterally, which is not limited by the subject application.

Second Embodiment

Figure 2:
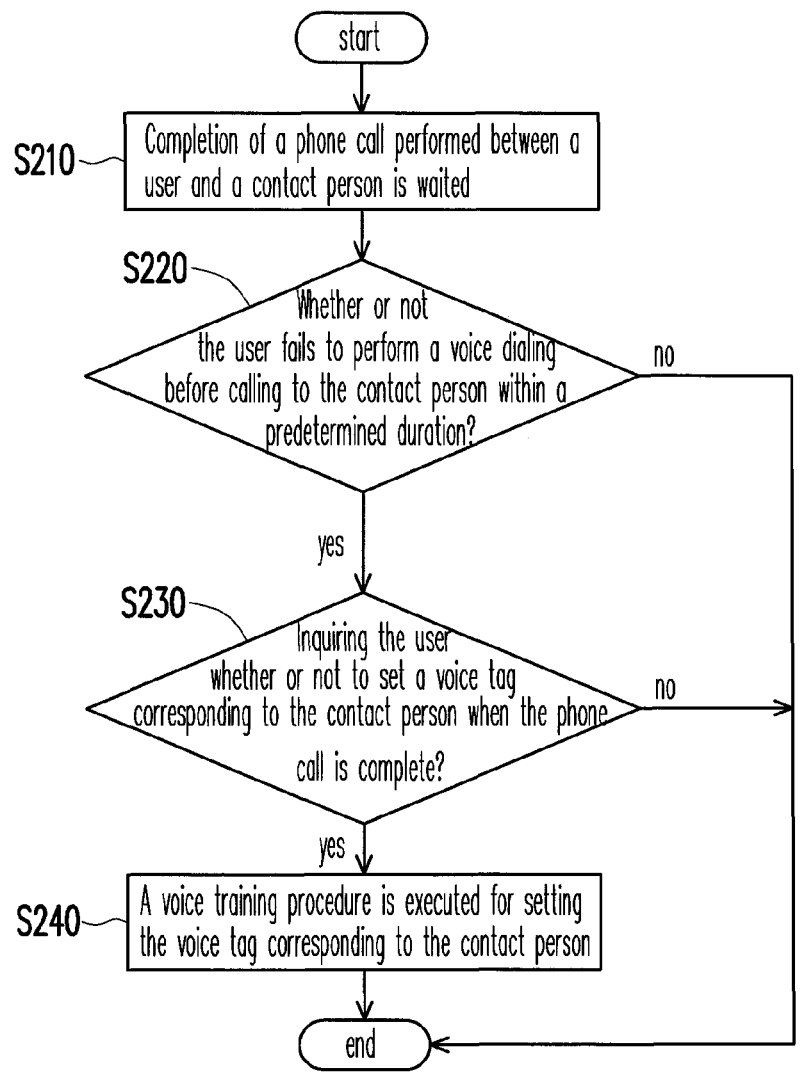
FIG. 2 is a flowchart illustrating a method for setting a voice tag according to a second embodiment of the present invention.

Referring to FIG. 2, FIG. 2 is a flowchart illustrating a method for setting a voice tag according to a second embodiment of the present invention. A main difference between the second embodiment and the first embodiment is that the counting of the number of the phone calls performed between the user and the contact person is unnecessary, and whether the contact person would be set the voice tag is directly identified by whether or not the user tries to perform the voice dialing. Once the voice tag corresponding to the contact person is still not established, the voice dialing thereof cannot be succeeded, and the dialing action may be performed via a keyboard dialing or by directly selecting the contact person from the contact list or a dialing record. Accordingly, in the present embodiment, the user is inquired whether or not to set the voice tag corresponding to the contact person for the future use, after the phone call between the user and contact person is completed.

Referring to FIG. 2, first, in step S210, completion of a phone call between the user and the contact person is waited. The step S210 is not necessarily to be the first step, and is only an example for one of the embodiments. Next, in step S220, concerning whether or not a voice dialing performed by the user is failed before calling to the contact person within a predetermined duration. If yes, get in step S230, the user is inquired whether or not to set a voice tag corresponding to the contact person after the phone call is complete. Then, if the user wants to set the voice tag, get in step S240, the voice training procedure is performed for setting the voice tag corresponding to the contact person. In the step 240, the voice training procedure includes resetting or directly setting the voice training. Since the former failed voice dialing speech of the user would be stored, the voice tag corresponding to the contact person may be directly set. Certainly, the user can make a decision from resetting or directly setting the voice training personally, which is not limited by the subject application.

Third Embodiment

Figure 3:
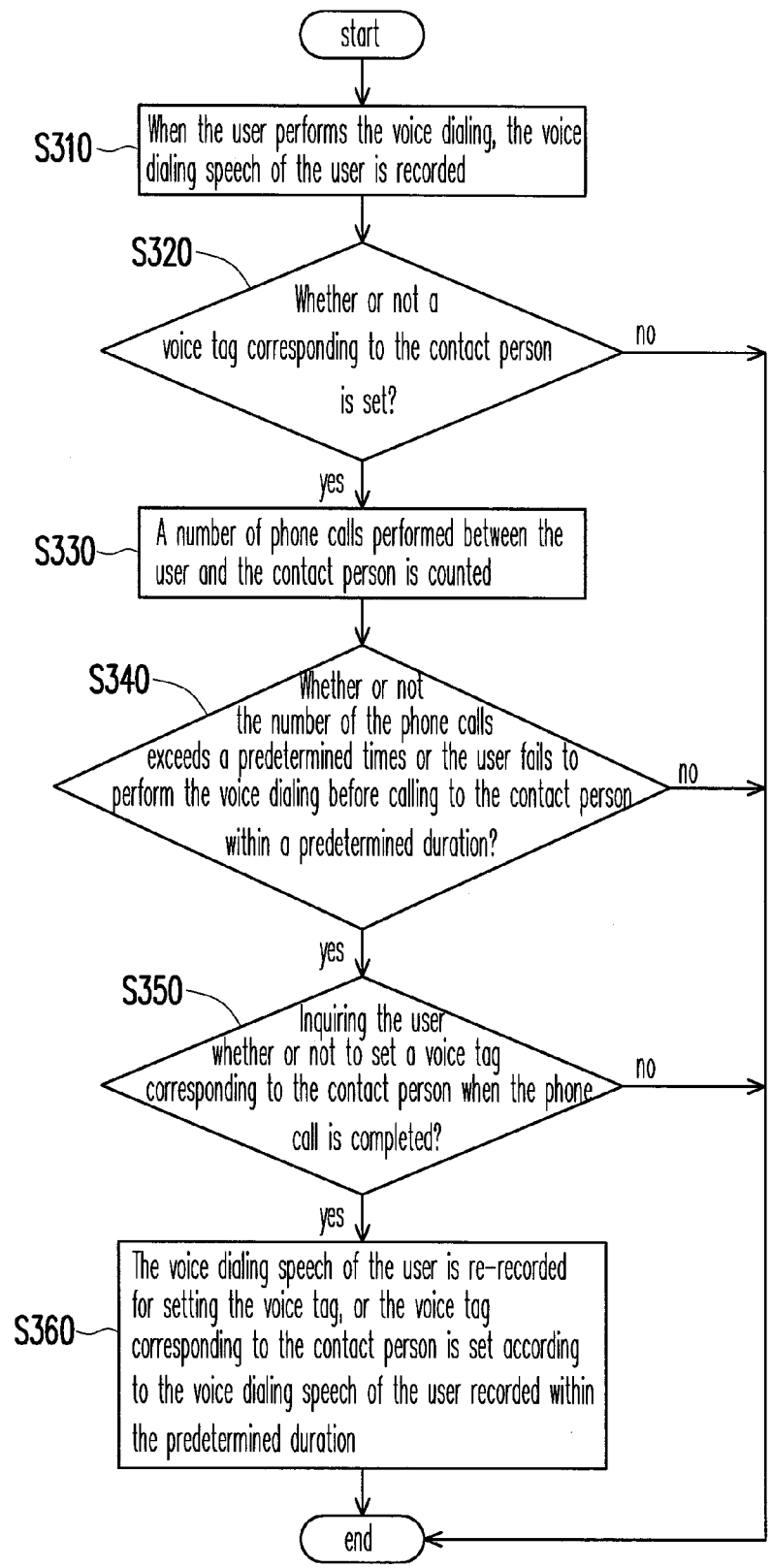
FIG. 3 is a flowchart illustrating a method for setting a voice tag according to a third embodiment of the present invention.

According to another aspect, we can deduce another method for setting the voice tag based on the technical features disclosed of the above embodiments. FIG. 3 is a flowchart illustrating a method for setting a voice tag according to a third embodiment of the present invention. First, in step S310, recording a voice dialing speech of a user when the user performs the voice dialing. Next, in step S320, concerning whether or not a voice tag corresponding to the contact person is set. If the voice tag does not be set, get in step S330, a number of phone calls performed between the user and the contact person is counted when the user dials to the contact person. If the voice tag is set, the voice dialing would be successful for connecting the user and the contact person on the phone, though such step is not illustrated in FIG. 3 For those skilled in the art would understand the possibility thereof, and therefore the detailed description thereof will not be repeated.

Next, in step S340, concerning whether or not the number of the phone calls performed between the user and the contact person exceeds a predetermined times or the voice dialing performed by the user is failed before calling to the contact person within a predetermined duration. If yes, get in step S350, the user is inquired whether or not to set a voice tag corresponding to the contact person after the phone call is completed. If the user decides to set the voice tag, get in step S360, the voice dialing speech of the user is re-recorded for setting the voice tag corresponding to the contact person, or the voice tag corresponding to the contact person is set based on the voice dialing speech of the user recorded within the predetermined duration. The user can make a decision from the above two methods, which is not limited by the subject application. Other detailed descriptions of the present embodiment may be referred to that of the first and the second embodiments, and therefore detailed description thereof will not be repeated.

In addition, it should be noted that in the aforementioned first to the third embodiments, a notification time for inquiring the user whether or not to set the voice tag may be changed by the user, which is not limited to be after the phone call being completed, and the user may also be notified to set the voice tag during the phone call or during a dialing process, which is not limited by the present embodiment.

In summary, in the subject application, the user may be automatically notified to set the voice tag according to the phone call record and a calling habit of the user. Therefore, the voice tag may be set without specific setting or starting the voice training procedure, so that the voice dialing becomes more convenient and personalized.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for setting a voice tag, comprising:
    a voice dialing is determined to have failed;
    calling a contact person within a predetermined duration in response to the voice dialing to have failed;
    inquiring whether or not to set the voice tag corresponding to the contact person in response to completing calling the contact person;
    performing a voice training procedure for setting the voice tag corresponding to the contact person in response to setting the voice tag; and
    do not perform the voice training procedure for setting the voice tag corresponding to the contact person in response to not setting the voice tag.

2. The method for setting a voice tag as claimed in claim 1, wherein the step of performing the voice training procedure for setting the voice tag comprises adding the contact person to a contact list.

3. The method for setting a voice tag as claimed in claim 1, further comprising:
    recording a voice dialing speech when the voice dialing is performed.

4. The method for setting a voice tag as claimed in claim 3, wherein the step of performing the voice training procedure for setting the voice tag comprises:
    setting the voice tag corresponding to the contact person according to the voice dialing speech.

5. The method for setting a voice tag as claimed in claim 3, wherein the step of performing the voice training procedure for setting the voice tag comprises:
    re-recording the voice dialing speech to set the voice tag.

6. The method for setting a voice tag as claimed in claim 5, wherein the step of performing the voice training procedure for setting the voice tag comprises:
    setting the voice tag corresponding to the contact person according to the re-recorded voice dialing speech.

7. The method for setting a voice tag as claimed in claim 1, wherein the contact person is identified according to a phone number of the contact person.

8. The method for setting a voice tag as claimed in claim 1, wherein the method for inquiring whether or not to set the voice tag corresponding to the contact person comprises a voice notification.

9. The method for setting a voice tag as claimed in claim 1, wherein the voice training procedure is a resetting procedure or directly setting procedure.

10. The method for setting a voice tag as claimed in claim 1, wherein the contact person is without a corresponding voice tag being previously established.

* * * * *